March 18, 1958     T. A. TAYLOR     2,827,019
ROCK DRILL CHUCK

Filed May 3, 1955                                  2 Sheets-Sheet 1

INVENTOR.
THOMAS A. TAYLOR
BY
ATTORNEY

March 18, 1958 T. A. TAYLOR 2,827,019
ROCK DRILL CHUCK
Filed May 3, 1955 2 Sheets-Sheet 2

*INVENTOR.*
THOMAS A. TAYLOR
BY
ATTORNEY 2,827,019
Patented Mar. 18, 1958

2,827,019

ROCK DRILL CHUCK

Thomas A. Taylor, Brecksville, Ohio, assignor to Westinghouse Air Brake Company, Pittsburgh, Pa., a corporation of Pennsylvania Application May 3, 1955, Serial No. 505,575

4 Claims. (Cl. 121—32)

This invention relates broadly to rock drills, but more particularly to an improved rock drill front end equipped with a dust collecting device.

One object of this invention is to provide a rock drill front housing of the dust collecting type with simple and positive means for maintaining the drill steel chuck bearings free of drilling dust.

Another object of this invention is to provide a rock drill front end with single and efficient means for rotationally locking the drill steel chuck to the chuck sleeve and also limiting the slidable movement of the chuck at least in one direction.

Another object of this invention is to provide a rock drill front end with common means for rigidly locking the drill steel chuck against rotation relative to the chuck sleeve and resiliently limiting axial movement of the chuck at least in one direction.

Another object of this invention is to produce a rock drill front end with the drill steel chuck and other movable parts arranged and disposed in a manner reducing to a minimum the number of bearings subjected to drilling dust, and providing such bearings with simple and efficient dust barriers preventing admission of dust or other abrasive material thereon.

Another object of this invention is to provide such a front housing with simple and efficient lubricating means for the drill steel chuck bearings, without danger of the lubricant becoming mixed with drilling dust to form a lapping compound causing excessive wear of the bearings.

Other objects and advantages more or less ancillary to the foregoing reside in the specific construction and aggroupment of the elements peculiar to this structure, as will become apparent from a more complete examination of this specification.

Figure 1:
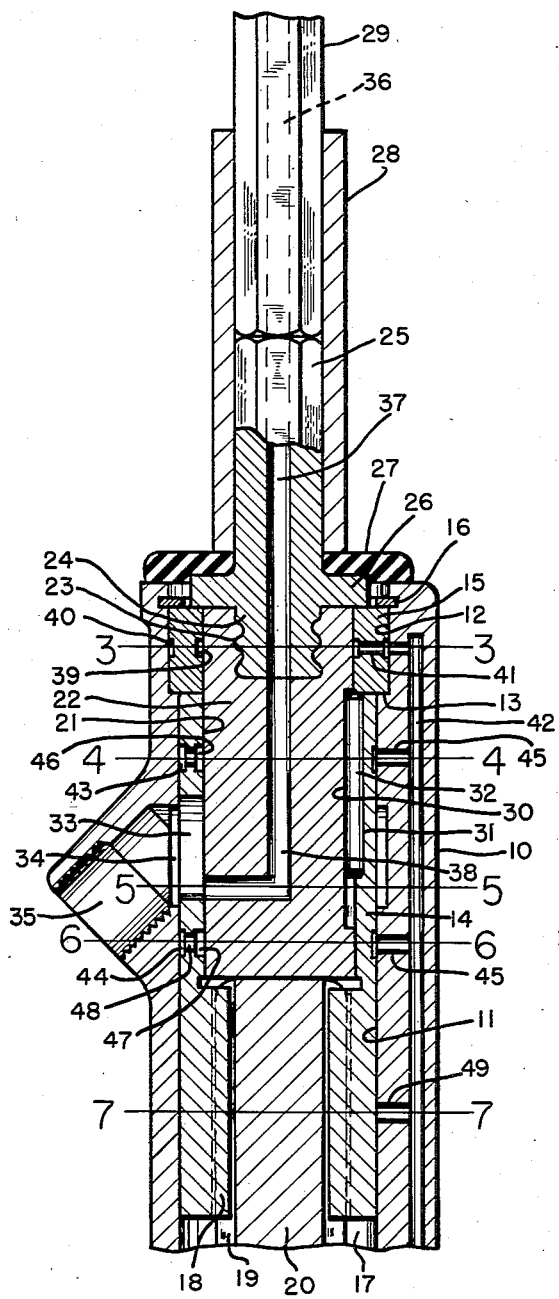
Fig. 1 is a longitudinal sectional view of a rock drill front end embodying the invention.

Figs. 3, 4, 5, 6 and 7 are cross sectional views taken on lines 3—3, 4—4 5—5, 6—6 and 7—7 respectively in Fig. 1.

Figure 2:
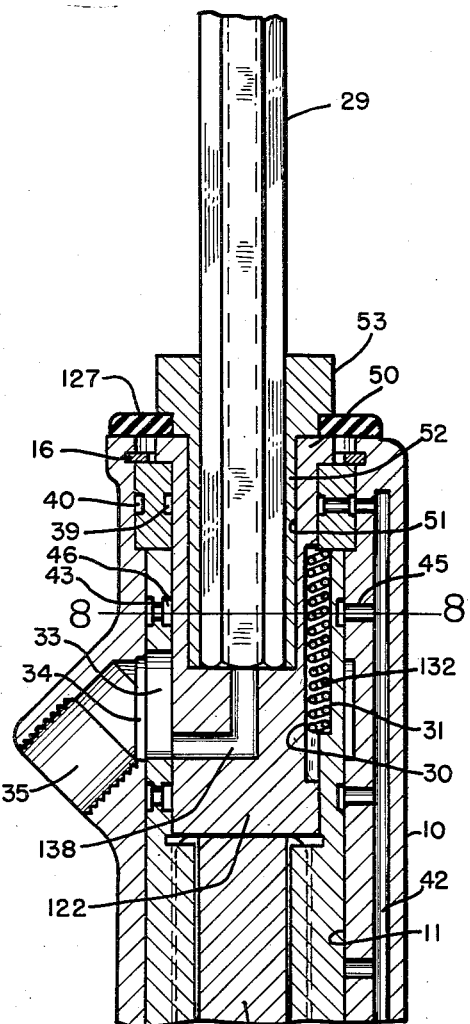
Fig. 2 is a view similar to Fig. 1, but illustrating a modified construction.
Figure 3:
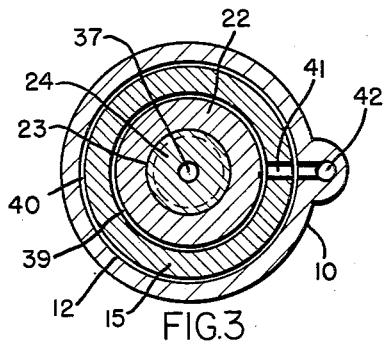
Figure 6:
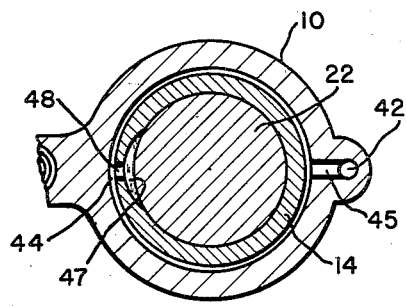
Figure 4:
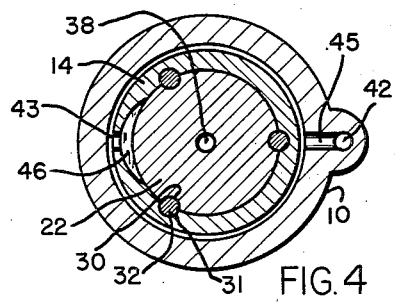
Figure 7:
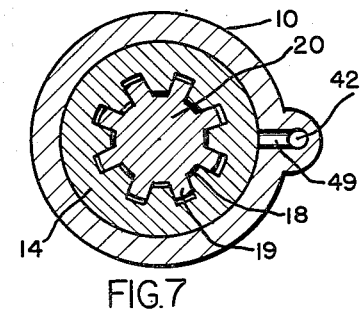
Figure 5:
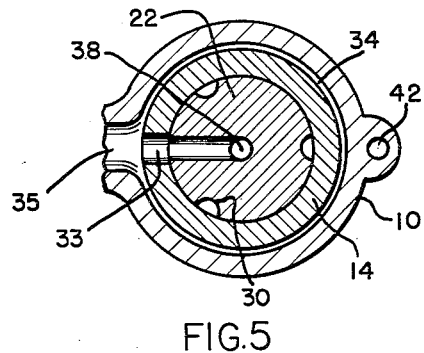
Figure 8:
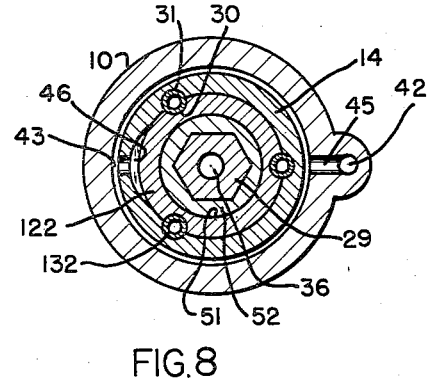

Fig. 8 is a cross sectional view taken on line 8—8 in Fig. 2.

Referring to the drawings, 10 designates a rock drill front housing having a bore centrally therethrough and defining a cylindrical inner wall 11. Except for a large counterbore 12 formed at its outer end and defining an annular shoulder 13, this bore is of uniform diameter throughout with its inner wall affording adequate bearing for a rotatable chuck sleeve 14. A front bushing 15 mounted within counterbore 12 and retained axially therein between the shoulder 13 and an annular spring clip 16 grooved within housing 10, limits endwise movement of the sleeve 14 in one direction. Endwise movement of the sleeve in the other direction is limited by end engagement with a spacer 17 fixed within the inner end of housing 10. The inner end portion of sleeve 14 is provided with internal splines 18 in mesh with corresponding splines 19 formed on the stem 20 of a piston, not shown, reciprocably mounted within the rock drill in the usual manner. This piston is also operatively associated with a rotation mechanism, well known in this art, through which reciprocatory motion of the piston also effects its rotation in one direction, which rotation is transmitted to the sleeve 14 by the interengagement of splines 18 and 19. The inner end of sleeve 14 is formed with a bore or cylindrical recess 21 extending centrally therethrough to end at the inner ends of the splines 18. This recess which is of uniform diameter throughout has mounted therein in slidable guided engagement therewith, a cylindrical drill steel chuck 22 which when in its innermost position within the sleeve 14 has its outer end substantially flush with the outer end of bushing 15.

The outer end of chuck member 22 is internally threaded as at 23 to receive the threaded inner end 24 of a polygonal stem member 25 extending axially beyond the front end of housing 10, and provided with an integral circular flange 26 engageable with the outer end of the bushing 15 for limiting inward movement of the chuck 22 into the sleeve 14. Over flange 26 is preferably mounted a rubber disk 27 engageable with the free end of the housing 10 to form a dust tight joint therewith. This disk also serves as a cushion for a sleeve coupler 28, of polygonal internal cross section, with its inner end portion slidably mounted on the stem 25 and loosely resting on the disk 27. The outer end portion of this coupler forms a polygonal socket adapted to receive the shank end of a drill steel 29.

In order to rotationally lock the chuck 22 to the sleeve 14, their interengaging bearing surfaces are provided with longitudinal recesses or grooves 30 and 31 respectively, peripherally spaced equally and of semi-cylindrical cross section, which when radially aligned accommodate cylindrical pins or dowels 32. As clearly shown in Fig. 1, the grooves 31 and dowels 32 are of equal lengths, while the grooves 30 are substantially longer than the dowels to enable limited axial movement of the chuck relative to the sleeve. Preferably this axial movement is checked inwardly by the flange 26 of stem 25 engaging bushing 15, and outwardly by the inner ends of the dowels 32 engaging the corresponding ends of the chuck grooves 30. However, the dowels could well be made to engage both ends of the grooves 30 to limit axial movement of the chuck in both directions. To facilitate assembly, the sleeve grooves 31 extend to the outer end of the sleeve and are covered by the inner end of bushing 15, which retains the dowels within the grooves 31.

Between the inner ends of its splines 18 and its extreme outer end, sleeve 14 is provided with an oblong orifice 33 extending through its wall and opening into a relatively wide annular groove 34 formed within the housing 10 and extending around the sleeve 14. This last groove also opens into a relatively large dust collecting passage 35, formed within the wall of housing 10, which is threaded to connect with one end of a flexible conduit, not shown, which has its other end connected to the vacuum side of a dust collector. Oblong orifice 33 is in constant communication with the usual drill steel hole 36 through a similar hole 37 provided through stem 25 and a dust passage 38 provided within the chuck 22.

In order to assure proper lubrication of the chuck member 22 within bushing 15, the latter is provided with internal and external annular grooves 39 and 40 connected by one or more radial ports 41, with the external groove 40 connected to a passage 42 formed within the wall of housing 10. This passage, which is generally controlled by the throttle valve controlling the operation of the rock drill, conveys oil laden compressed air to the interior of bushing 15 via groove 39.

On each side of the dust collecting groove 34, the sleeve 14 is provided with annular grooves 43 and 44 also connected with the passage 42 through radial ports 45. On each end of the oblong orifice 33, the sleeve 14 has its inner wall formed with crescent-shaped grooves 46 and 47 connected with the annular groove 43 and 44 respectively through radial ports 48. Another radial port 49 connects passage 42 with the inner end portion of sleeve 14 to assure proper lubrication of that portion of the sleeve within housing 10.

In the modification shown in Fig. 2, the sleeve 14 is the same as in Fig. 1, but the dowels 32 have been replaced by relatively stiff compression springs 132 which rigidly lock the chuck member 122 against rotation relative to the sleeve, and by engagement of the inner ends of the longitudinal grooves 30 with the springs resiliently limit the outward movement of the chuck member. In this modified construction the chuck member 122 has its outer end formed with an external annular flange 50 engageable with bushing 15 for limiting inward movement of the chuck member into sleeve 14. Its outer end portion is also provided with a flat bottom cylindrical bore 51 having fitted therein a chuck bushing 52. This bushing is locked to the chuck by means of a press fit or the like, and internally is of polygonal cross section to slidably but non-rotatably receive the shank of the drill steel 29. Bushing 52 also has a head 53 resting on the outer end of the chuck and carrying a rubber disk or shield 127 adapted to engage the end of the chuck housing 10 to prevent admission of drilling dust into the house. From the bottom of the bore 51 extends a dust passage 138 which has its outlet end opening in the oblong orifice 33. Since the rest of this modified construction is exactly the same as above described and shown in Fig. 1, the corresponding parts thereof have been given like symbols.

The operation of the chuck mechanism shown in Fig. 1 is as follows: As the rock drill is actuated in the usual manner to effect the reciprocatory motion of the piston and its stem 20, impacts in rapid succession are delivered on the inner end of the chuck member 22 by the piston stem 20, and rotation from the piston stem is also transmitted to the chuck member through the chuck sleeve 14. From chuck member 22 impacts and rotation are transmitted to the drill steel 29 to drill a hole in the rock in the usual and well known manner. Concurrently oil laden compressed air is conveyed by passage 42 into annular grooves 39, 46, 47 and port 49 to provide efficient lubrication of the bearing surfaces adjacent such grooves and port.

As the dust collecting device is turned on, a vacuum or suction is created in the dust groove 34 through the conduit, not shown, connected to the dust passage 35, thereby drawing air, dust and cuttings into the groove 34 through the drill steel hole 36, stem hole 37, chuck passage 38 and oblong orifice 33. From groove 34, air, dust and cuttings are drawn into the dust collecting device through the conduit connected to the passage 35. The only possibility for the abrasive dust to gain access to the bearing surfaces between the sleeve 14 and housing 10, is over the marginal edges of the groove 34. However since compressed air is admitted into annular grooves 43 and 44 located adjacent the groove 34 on both sides thereof, it will, as it leaks out of the grooves 43 and 44 establish dust barriers preventing the dust from seeping out of groove 34 onto the bearing surfaces of the sleeve and housing.

It will be noticed that the length of the orifice 33 is greater than the possible axial travel of the chuck member 22, the length of which is determined by the unoccupied portion of the longitudinal grooves 30 relative the dowels 32, thereby assuring constant registration of the outlet end of chuck passage 38 with the orifice 33. As to the possible access of dust on the sliding bearing surfaces between the chuck member and the sleeve, such access can take place only over the marginal edges of the oblong orifice 33. To prevent such occurrence or at least limit it to a minimum, the crescent-shaped grooves 46 and 47 have been provided adjacent the longitudinal ends of the orifice 33, thereby causing compressed air flowing or leaking out of the grooves 46 and 47 to establish barriers to the longitudinal seepage of dust onto the bearing surfaces between chuck member 22 and sleeve 14.

It will be understood that in the present construction, even if no dust barriers had been provided, the relatively small amount of dust capable of escaping from the dust groove 34 could not materially affect the relatively large rotary bearing surfaces between the sleeve 14 and housing 10. In other words, the extension of the sleeve 14 to substantially the free end of the housing 10, provides for better and longer wearing rotary bearing surfaces between the sleeve and housing. Similarly, since the chuck member 22 is capable of only relatively short axial movement or strokes within the sleeve 14, any small amount of dust which may escape over the longitudinal edges of the oblong orifice 33 is not likely to materially affect the relatively large sliding bearing surfaces between the chuck and sleeve. In other words, by rotationally locking the chuck to the sleeve through the dowels 32 and limiting outward movement of the chuck also by the same dowels, the chuck 22 is provided with better and longer wearing bearing surfaces with the sleeve 14.

The operation of the modified construction shown in Fig. 2 is the same as explained above, except that the compression springs 132 while rigidly locking the chuck member 122 against rotation relative to the sleeve 14, also act as cushion members for resiliently limiting outward movement of the chuck member. In normal drilling operation, such feature is not important because the rock drill is generally fed to the work with the drill steel pressed against the face of the rock or bottom of the hole, and the chuck cannot travel but a very short distance upon each impact of the piston stem thereon. However, when the rock drill is accidentally operated with the drill steel away from the face of the rock or bottom of the hole, then the chuck member 122 responsive to the impacts of the piston stem 20, is free to travel outward until it is checked by the bottom ends of the longitudinal grooves 30 engaging the springs 132.

The details of structure and arrangement of parts shown and described may be variously changed and modified without departing from the spirit and scope of the invention as herein claimed.

I claim:

1. In a rock drill, a chuck housing, a piston reciprocable and rotatable in said housing, a chuck sleeve axially retained in said housing and in spline engagement with said piston for rotation therewith, a drill chuck slidable within said sleeve, interengaging bearing surfaces on said chuck and sleeve, radially aligned longitudinal recesses within said surfaces, a dowel pin within said recesses rotationally locking said chuck and sleeve, one of said recesses being longer than said pin to enable slidable movement of said chuck and having one end thereof engageable with the corresponding end of said pin to limit said slidable movement in one direction.

2. In a rock drill, a chuck housing, a piston reciprocable and rotatable in said housing, a chuck sleeve axially retained in said housing and in spline engagement with said piston for rotation therewith, a drill steel chuck slidable within said sleeve, means rotationally locking said chuck and sleeve, sliding bearing surfaces on said chuck and sleeve, a dust groove on one of said surfaces surrounding said sleeve and adapted to be connected to a suction source, a dust passage within said chuck, an orifice through the wall of said sleeve connecting the outlet end of said passage with said groove, and passages connected to a source of compressed air opening on said surfaces adjacent said orifice.

3. In a rock drill, a chuck housing, a piston reciprocable and rotatable in said housing, a chuck sleeve axially retained in said housing and in spline engagement with said piston for rotation therewith, a drill steel chuck slidable within said sleeve, and a removable spring member longitudinally between said chuck and sleeve rigidly preventing relative rotation therebetween and resiliently limiting said slidable movement in at least one direction.

4. In a rock drill, a chuck housing, a piston reciprocable and rotatable in said housing, a chuck sleeve axially retained in said housing and in spline engagement with said piston for rotation therewith, a drill steel chuck slidable within said sleeve, and spring means between said chuck and sleeve rigidly preventing relative rotation therebetween and resiliently limiting said slidable movement in at least one direction.

References Cited in the file of this patent

UNITED STATES PATENTS

| | | |
|---|---|---|
| 1,084,152 | Kessel | Jan. 13, 1914 |
| 2,019,332 | Atkins | Oct. 29, 1935 |
| 2,458,289 | Morrison | Jan. 4, 1949 |
| 2,477,054 | Gartin | July 26, 1949 |
| 2,767,957 | Feucht | Oct. 23, 1956 |